(12) United States Patent
Gasbarro

(10) Patent No.: US 8,439,730 B1
(45) Date of Patent: May 14, 2013

(54) GIZZARD PROCESSING APPARATUS

(75) Inventor: Geno N. Gasbarro, Columbus, OH (US)

(73) Assignee: Remington Holdings LLC, Columbus, OH (US)

( * ) Notice: Subject to any disclaimer, the term of this patent is extended or adjusted under 35 U.S.C. 154(b) by 0 days.

(21) Appl. No.: 13/397,162

(22) Filed: Feb. 15, 2012

(51) Int. Cl.
A22C 21/06 (2006.01)

(52) U.S. Cl.
USPC .......................................................... 452/111

(58) Field of Classification Search .................. 452/106, 452/111–114
See application file for complete search history.

(56) References Cited

U.S. PATENT DOCUMENTS

| | | | |
|---|---|---|---|
| 4,073,040 A * | 2/1978 | Hill ................................ | 452/112 |
| 4,395,795 A | 8/1983 | Hazenbroek | |
| 4,574,427 A * | 3/1986 | Harben et al. ................ | 452/117 |
| 4,748,722 A * | 6/1988 | Risser et al. .................. | 452/111 |
| 4,815,166 A * | 3/1989 | Martin et al. ................. | 452/114 |
| 5,041,053 A * | 8/1991 | Ellis et al. ..................... | 452/106 |
| 5,186,678 A * | 2/1993 | Conner et al. ................ | 452/106 |
| 8,303,383 B2 * | 11/2012 | Jansen et al. ................. | 452/111 |

* cited by examiner

*Primary Examiner* — Richard Price, Jr.
(74) *Attorney, Agent, or Firm* — Jason H. Foster; Kremblas & Foster

(57) ABSTRACT

An apparatus and method for splitting and cleaning poultry gizzards. A poultry gizzard with proventriculus attached thereto is moved in sequence along a processing path, first along a pair of conveyor rollers that support the gizzard and pull the proventriculus downwardly between the conveyor rollers and then along a pair of engaging cutting spindles which sever the proventriculus from the gizzard. The gizzard is then transferred to a cutting station where a water knife cuts a slit into the gizzard, exposing the interior cavity of the gizzard and loosening ingest contained therein. The gizzard is then spread open by a spreading fin and adjoining rails that enter and enlarge the freshly cut slit. A water sprayer manifold then sprays pressurized water into the exposed cavity to flush and forcibly clean ingest out of the cavity.

22 Claims, 5 Drawing Sheets

GIZZARD PROCESSING APPARATUS

CROSS-REFERENCES TO RELATED APPLICATIONS (Not Applicable)

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

This invention relates generally to a poultry processing apparatus and more particularly to an apparatus for automatically splitting and cleaning poultry gizzards.

In order to prepare a poultry gizzard for human consumption, the gizzard must generally first be cut open so that it can be emptied of any ingest that has accumulated therein.

Ingest typically consists of undigested, non-food matter, such as sand and small stones, that were consumed by the poultry when it was alive. Automated machines and processes have been developed for performing this cutting and cleaning task so that safety hazards, labor costs, inconsistencies, and other undesirable aspects of manual processing can be mitigated. An example of such an automated machine is described in U.S. Pat. No. 4,395,795 to Hazenbroek. Traditionally, such automated machines have employed a cleaving, straight blade or a rapidly rotating, circular blade into which a poultry gizzard is directed. In either case, the blade slices the gizzard in half, exposing the tightly packed ingest inside. In the case of larger gizzards, such as those of turkeys, a second blade may be employed for cutting the gizzard into fourths. The sliced gizzard portions are then conveyed along a pressurized water spray manifold that cleans the ingest out of the portions.

A problem commonly associated with automated gizzard cutting processes such as the one described above is that the blade that is employed to cut the gizzards is repeatedly brought into contact with the ingest contained in the gizzards. The sharpened edge of the blade therefore wears against stones and other hard, indigestible matter during the cutting process. The blade thus becomes dull very quickly, thereby necessitating frequent replacement of the blade. Such replacement is time-consuming, labor-intensive, and expensive. Moreover, after a gizzard has been cut by a circular blade, the ingest typically remains tightly packed inside the cut gizzard portions and can therefore be difficult to remove.

In view of the foregoing, it would be advantageous to provide an apparatus for efficiently cutting poultry gizzards without requiring the frequent replacement of a blade or blades. It would further be advantageous to provide such an apparatus that additionally loosens the ingest in the gizzards as a preparatory measure to enhance the efficacy of subsequent cleaning processes.

BRIEF SUMMARY OF THE INVENTION

In accordance with the present invention, there is provided an apparatus and method for splitting and cleaning poultry gizzards. In a first contemplated embodiment of the invention, a poultry gizzard is manually fed into an angled chute with the still-attached proventriculus of the gizzard dangling through a longitudinally-elongated gut channel formed in the bottom of the chute. The gizzard slides by gravity through the chute onto a pair of rotatably driven conveyor rollers having helical and longitudinally-extending ridges extending radially therefrom. The conveyor rollers cooperatively rotate to urge the gizzard in a downstream direction along a product path while simultaneously pulling the proventriculus of the gizzard downwardly, into a gap between the conveyor rollers. The gizzard is then conveyed along a pair of rotatably driven cutting spindles having intermeshing cutting threads extending radially therefrom that engage and sever the proventriculus.

With the proventriculus of the gizzard removed, the gizzard is conveyed over a water knife that cuts a slit into the bottom of the gizzard, exposing the interior cavity of the gizzard and loosening the ingest contained therein. The gizzard is then forced over a spreading fin and adjoining spreading rails that enter the slit and further separate the lobes of the split gizzard.

Finally, the gizzard is conveyed over a water sprayer manifold having plurality of longitudinally spaced nozzles that emit streams of water upwardly, between the spreading rails, into the cavity of the gizzard. The cavity is thereby forcibly flushed and cleaned of ingest.

In a second contemplated embodiment of the invention, a poultry gizzard with its proventriculus already removed is placed on a conveyor line that carries the gizzard along a product path in a downstream, direction. The gizzard engages a downwardly-angled presser plate mounted above the product path that compresses the gizzard against the conveyor line and secures the orientation of the gizzard. The gizzard then passes below a water knife mounted above the downstream end of the presser plate that cuts a slit into the top of the gizzard, exposing the interior cavity of the gizzard and loosening the ingest contained therein.

Next, the gizzard is conveyed below a spreading fin that enters and enlarges the freshly cut slit in the gizzard. As the gizzard is conveyed further downstream, the separated lobes of the gizzard move onto the sides of a wedge-shaped water reservoir having a tapered lower edge that is substantially contiguous with the spreading fin. The lower edge of the reservoir has a plurality of longitudinally-spaced apertures formed therethrough through which streams of water are emitted into an interior cavity of the gizzard, thereby forcibly flushing and cleaning ingest out of the cavity.

Figure 1:
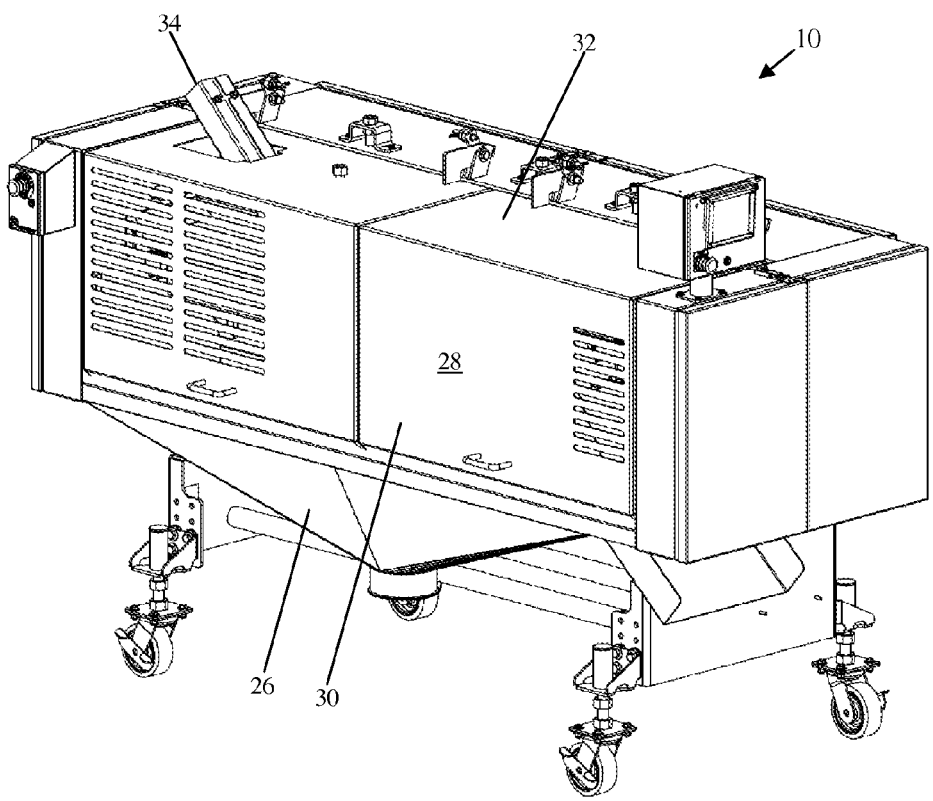
FIG. 1 is a perspective view illustrating a first embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

Figure 2:
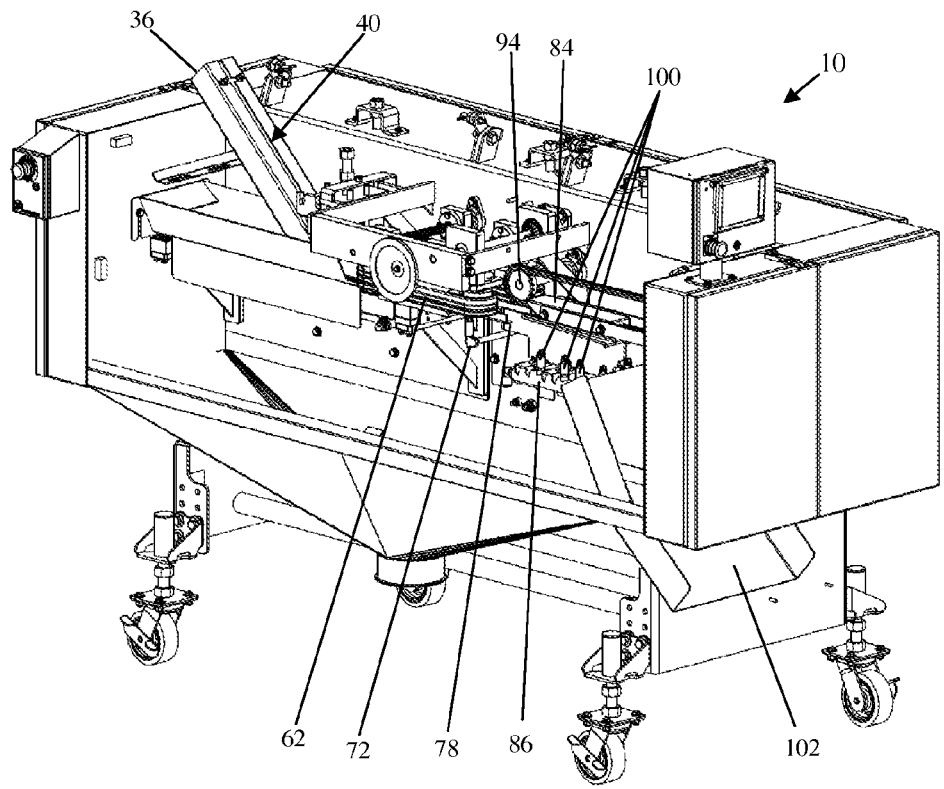
FIG. 2 is a perspective view illustrating the first embodiment of the present invention shown in FIG. 1 with the protective cover of the apparatus removed.
Figure 3:
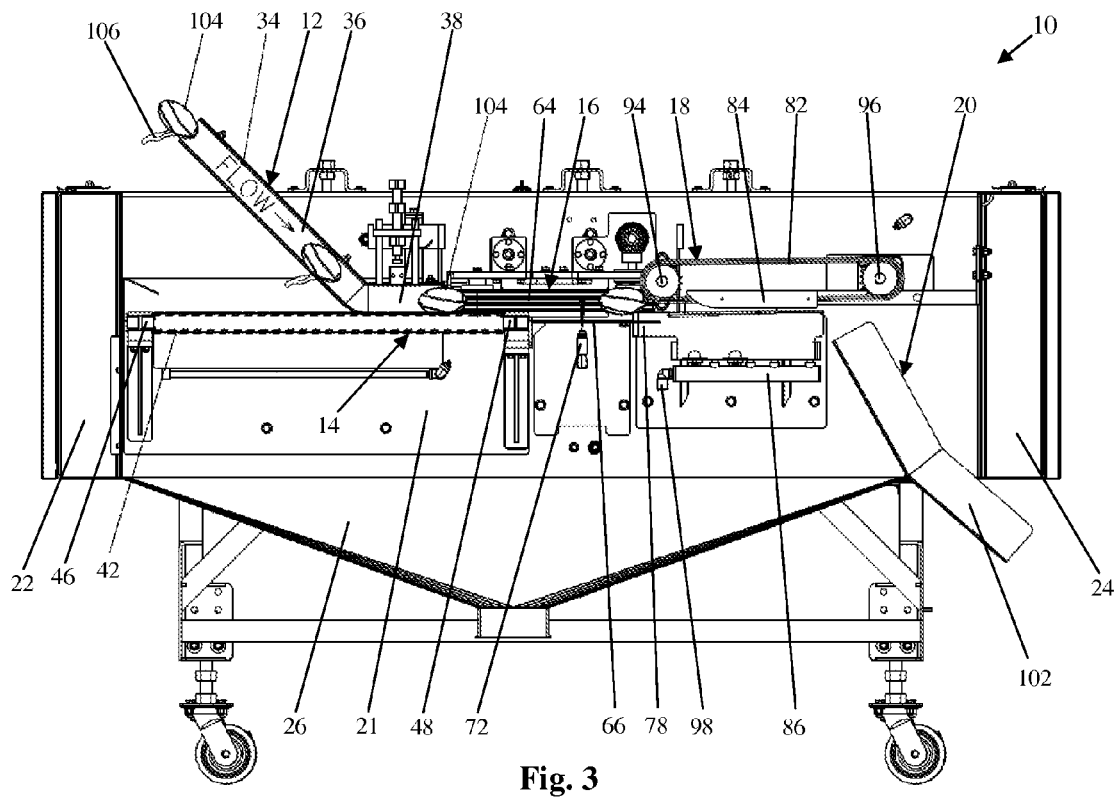
FIG. 3 is a cut-away, side elevation view illustrating the first embodiment of the present invention shown in FIG. 1.
Figure 4:
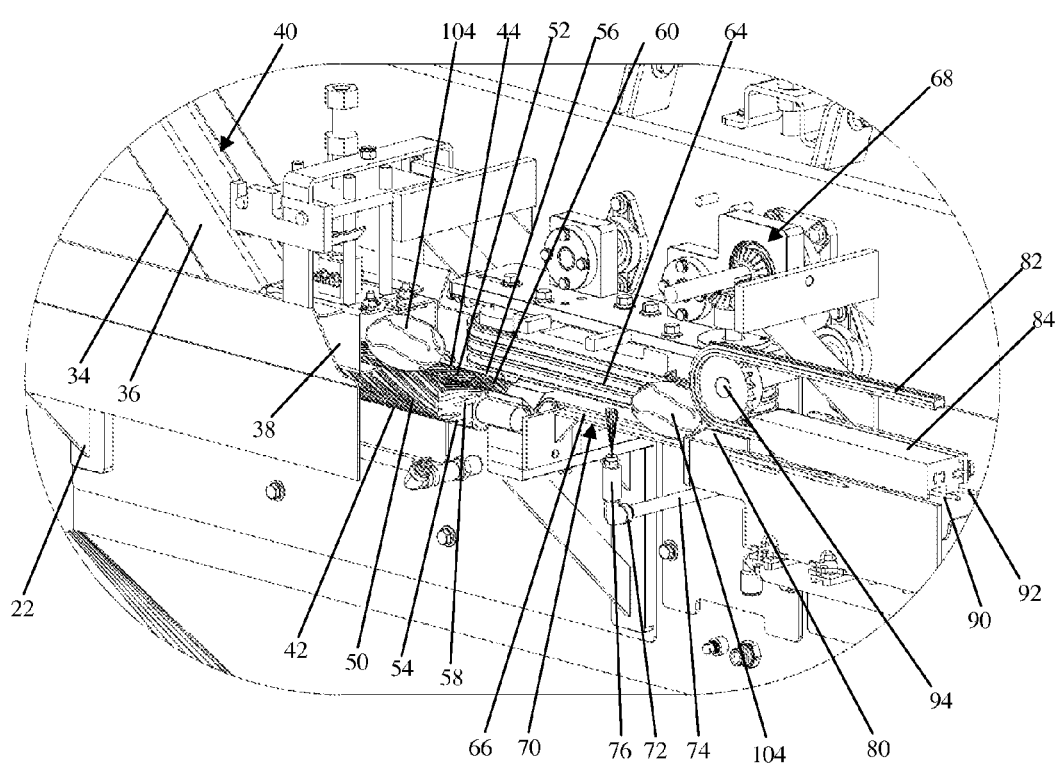
FIG. 4 is a cut-away, detail view illustrating several components of the first embodiment of the present invention shown in FIG. 1.

Referring to FIGS. 1-5*b*, a first contemplated embodiment of the poultry gizzard processing apparatus of the present invention (hereafter referred to as "the apparatus 10") is illustrated. The apparatus 10 generally includes, in sequence and best viewed in FIG. 3, an infeed station 12, a gut-removal station 14, a splitting station 16, a cleaning station 18, and an outlet station 20. The apparatus 10 further includes a rear support wall 21 and adjoining side support walls 22 and 24 to which the aforementioned components of the apparatus 10 are directly or indirectly mounted, as well as a trough 26 located below the aforementioned components for catching waste matter that falls therefrom. A protective cover 28 (shown in FIG. 1), defined by perpendicularly-adjoining front and top walls 30 and 32, is hingidly mounted to the rear support wall 21 for shielding workers from the moving parts of the apparatus 10 and mitigating the risk of injury. The protective cover 28 also provides convenient access to the components of the apparatus 10, such as for repair or replacement, when the cover 28 is pivoted to a raised position. The apparatus 10 is shown in FIGS. 2-4 with the protective cover entirely removed for clarity.

Unless otherwise noted, all components of the apparatus 10 are fabricated from stainless steel. It is contemplated that various components of the apparatus 10 can alternatively be fabricated from any other sufficiently rigid, food-grade material, including, but not limited to aluminum, polyoxymethylene (sold under the brand name DELRIN), and various composites.

For the sake of convenience and clarity, terms such as "top," "bottom," "up," "down," "inward," "outward," "vertical," "horizontal," "upstream," "downstream," "lateral," and "longitudinal" will be used herein to describe the relative placement and orientation of various components of the apparatus 10, all with respect to the geometry and orientation of the apparatus as it appears in FIG. 3. Particularly, the length of the apparatus 10 is along a horizontal line that extends from the leftmost end of the apparatus 10 to the rightmost end of the apparatus 10, and the term "upstream" refers to a longitudinal position nearer the left end of the apparatus 10 while the term "downstream" refers to a longitudinal position nearer the right end of the apparatus 10. Said terminology will include the words specifically mentioned, derivatives thereof, and words of similar import.

Still, referring to FIGS. 1-5*b*, the infeed station 12 of the apparatus 10 includes an infeed chute 34 having an angled portion 36 that extends from an upper inlet end downwardly, at a preferred angle of about 45 degrees, through the top wall 32 of the protective cover 28 to a substantially horizontal portion 38 terminating in a lower outlet end. The outlet end of the infeed chute 34 has a substantially open floor that is positioned above the upstream end of the gut-removal station 14 (described below). The interior of the infeed chute 34 is preferably large enough to accommodate a largest anticipated poultry gizzard.

The angled portion 36 of the chute 34 is laterally bisected on the top and bottom faces by a channel 40, hereafter referred to as "the gut channel 40," that extends from the inlet end of the chute 34 to the outlet end. The gut channel 40 is wide enough to allow the proventriculus of a poultry gizzard to dangle therethrough below the floor of the chute 34, but is not wide enough to allow the passage of a gizzard of a conventional size.

The gut-removal station 14 of the apparatus 10 includes a pair of closely spaced, parallel conveyor rollers 42 and 44. The conveyor rollers 42 and 44 extend longitudinally below the horizontal portion 38 of the chute 34 from a first end located adjacent the upstream end of the apparatus 10 to a second end adjacent the upstream end of the splitting station 16 (described below). The conveyor rollers 42 and 44 are rotatably mounted to the brackets 46 and 48 that extend laterally from the rear support wall 21, such as by mounting in conventional replaceable bearings, for allowing the conveyor rollers 42 and 44 to rotate freely about their longitudinal axes. Each of the substantially cylindrical conveyor rollers 42 and 44 has a plurality of helical and longitudinally-elongated ridges 50 and 52 projecting radially from its outer surface. The helical ridges 50 of the conveyor roller 42 are oppositely threaded with respect to the helical ridges 52 of the conveyor roller 44. During operation of the apparatus 10, the adjacent ridges 50 and 52 of the opposing conveyor rollers 42 and 44 rotate toward each other and downward in a manner that simultaneously urges a gizzard sitting on top of the conveyor rollers 42 and 44 in the downstream direction and pulls the dangling proventriculus of a gizzard downwardly, into a narrow gap between the conveyor rollers 42 and 44 (as described in greater detail below).

The downstream ends of the conveyor rollers 42 and 44 terminate in short cutting spindles 54 and 56 that are preferably coaxial and integral with their respective conveyor rollers. Each of the cutting spindles 54 and 56 has a plurality of sharp, helical cutting threads 58 and 60 extending radially therefrom that extend to a larger overall diameter than the ridges 50 and 52 of its respective conveyor roller 42 and 44. The threads 58 of the cutting spindle 54 thus overlap with and cooperatively engage the threads 60 of the cutting spindle 56 in an intermeshing fashion.

During operation of the apparatus 10, the conveyor roller 44 nearest the rear support wall 21 is rotatably driven by a motor (not within view) located adjacent the upstream end of the conveyor roller 44. Such rotational movement is transferred to the opposing conveyor roller 42 through the intermeshed engagement between the helical threads 58 and 60 of the cutting spindles 54 and 56 in the manner of intermeshing gears, thereby causing the conveyor roller 42 to rotate in an opposite direction relative to the conveyor roller 44. Specifically, when viewed end-on from the upstream end of the apparatus 10, the conveyor roller 44 is rotated in a clockwise direction and the conveyor roller 42 is rotated in a counter-clockwise direction. Of course the conveyor rollers 42 and 44 can be driven in opposite rotational directions if need be, such as if an object becomes stuck between the conveyor rollers 42 and 44. The motor that drives the conveyor roller 44 is preferably a conventional servo motor, but could be substituted by a hydraulic or pneumatic motor or any other suitable prime mover as will be understood by those of ordinary skill in the art.

The splitting station 16 of the apparatus 10 includes a pair of laterally-opposing, rotatably mounted sticker chain belts 62 and 64 that flank a longitudinally-elongated splitting platform 66. Each of the opposing sticker chain belts 62 and 64 preferably includes three vertically adjacent sticker chains (the spikes that extend from the sticker chains are not shown, but are well known to those of ordinary skill in the art). The opposing belts 62 and 64 thus define a longitudinal product path therebetween that is wide enough to accommodate a poultry gizzard, with the spikes of the opposing belts 62 and 64 trapping and piercingly engaging the sides of the gizzard (as described in greater detail below), and with the splitting platform 66 supporting the bottom of the gizzard. It is contemplated that a greater or lesser number of sticker chains can be employed in each opposing sticker chain belt 62 and 64 without departing from the invention. It is further contemplated that the spikes of the sticker chains can be replaced by any other type of suitable gripping structures, such as claws or teeth, or that the sticker chains can be replaced by belts or tracks having gnarled or high friction surfaces.

The opposing sticker chain belts 62 and 64 are operatively mounted to corresponding pairs of longitudinally-spaced sprockets 63, 65, 67, and 69 (best shown in FIG. 5b) that are rotatably mounted to brackets extending from the rear wall, such as by mounting in conventional replaceable bearings. The sprockets 63-69 of the opposing sticker chain belts are rotatably driven in opposite directions by an electric motor (not within view) through a conventional gearing assembly 68 in a manner that will be readily understood by those of ordinary skill in the art. During operation of the apparatus 10, the sprockets 63-69 rotatably drive the sticker chain belts 62 and 64 in the manner of conventional, endless conveyors, with the opposing, inward-facing surfaces of the belts 62 and 64 being driven in the downstream direction at a uniform rate of speed.

Referring to FIG. 4, the upstream end of the splitting platform 66 (only one lateral half of the platform is shown) is located immediately downstream from the downstream end of the cutting spindles 54 and 56. The downstream longitudinal half of the splitting platform 66 is laterally bisected by a longitudinally-elongated channel 70, hereafter referred to as "the splitting channel 70." The splitting channel 70 is preferably about half an inch wide, although it is contemplated that the splitting channel 70 can be made wider as long as it is not wide enough to allow a poultry gizzard to pass therethrough. The purpose of the splitting channel 70 will be described below.

A high pressure water sprayer 72, hereafter referred to as "the water knife 72," extends from the rear support wall 21 below the splitting platform 66 and includes a water supply line 74 and an upwardly directed nozzle 76. The water supply line 74 is connected to a high pressure water pump (not shown). The nozzle 76 extends to a position immediately below the upstream end of the splitting channel 70. During operation of the apparatus 10, the nozzle 76 emits a narrow, high-pressure stream of water upwardly, through the splitting channel 70. The stream of water is sufficiently pressurized to split a poultry gizzard that is conveyed along the product path of the splitting platform 66, as will be described in greater detail below.

Referring to FIGS. 2-5b, the cleaning station 18 of the apparatus 10 includes a spreading fin 78, a cleaning platform 80, a sticker chain 82, a retaining block 84, and a water sprayer manifold 86. The spreading fin 78 is a narrow, substantially planar, vertically-oriented plate that extends into the downstream end of the splitting channel 70 intermediate the downstream ends of the opposing sets of sticker chains 62 and 64. The spreading fin 78 is preferably rigidly mounted to the cleaning platform 80 (described below) and extends upstream therefrom. The top edge of the spreading fin 78 preferably extends above the splitting platform 66. The downstream end of the top edge of the spreading fin 78 is preferably downwardly angled for reasons that will become apparent below.

The cleaning platform 80 is mounted to the rear wall and extends forward to a position longitudinally aligned with the splitting platform 66 of the splitting station 16. The cleaning platform 80 includes a nose 88 at its upstream end that is immediately adjacent, and is vertically and laterally aligned with, the top edge of the downstream end of the spreading fin 78. The cleaning platform further includes a pair of longitudinally-elongated, parallel spreading rails 90 and 92 that extend laterally outwardly and downstream from the downstream end of the nose 88 to the upstream end of the outlet station 20 (described below). The spreading rails 90 and 92 are preferably separated by a lateral distance of about one inch.

The sticker chain 82 of the cleaning station 18 is operatively mounted in a vertical orientation to a pair of longitudinally-spaced sprockets 94 and 96 (the spikes that extend from the sticker chain 82 are not shown, but are of a conventional type that is well known to those of ordinary skill in the art). The sprocket 94 at the upstream end of the sticker chain 82 is rotatably mounted to an axle that extends from the rear support wall 21, such as by mounting in conventional replaceable bearings, and the sprocket 96 at the downstream end of the line is rigidly mounted to a horizontally-extending drive shaft that protrudes from the rear support wall 21. The drive shaft is rotatably driven by a motor (not within view), thereby driving the sticker chain 82 in the manner of an endless conveyor, with the lower run of the sticker chain 82 being driven in the downstream direction.

Figure 5A:
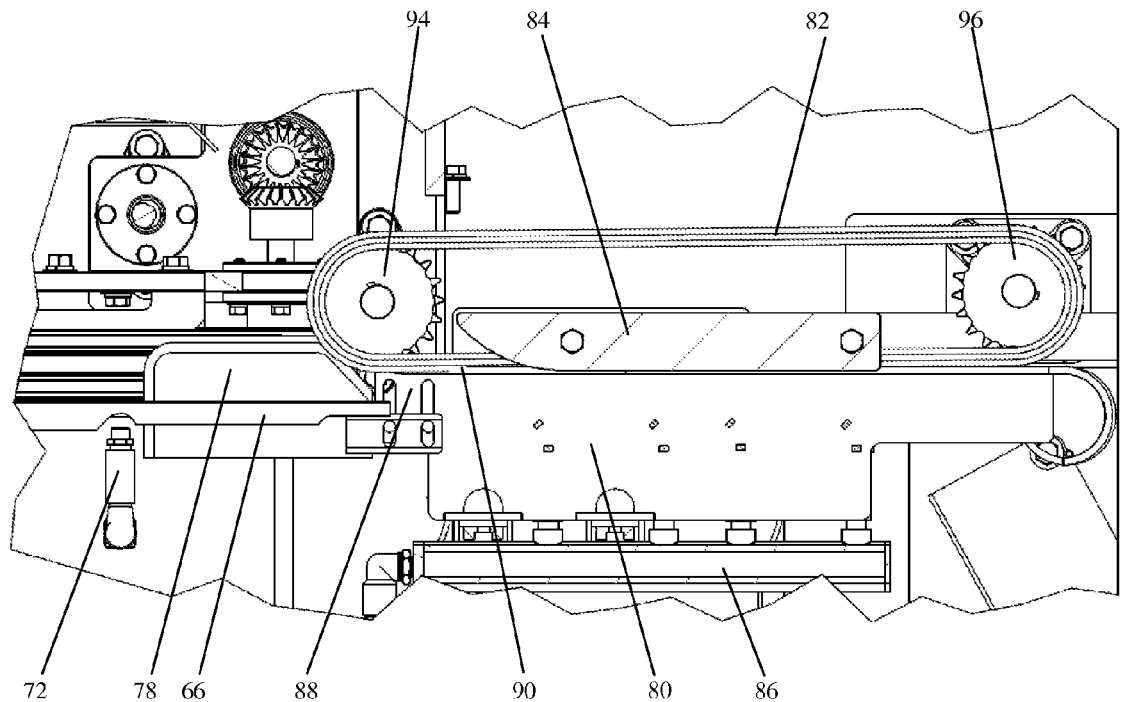
FIG. 5a is a detail, side elevation view illustrating several components of the first embodiment of the present invention shown in FIG. 1.
Figure 5B:
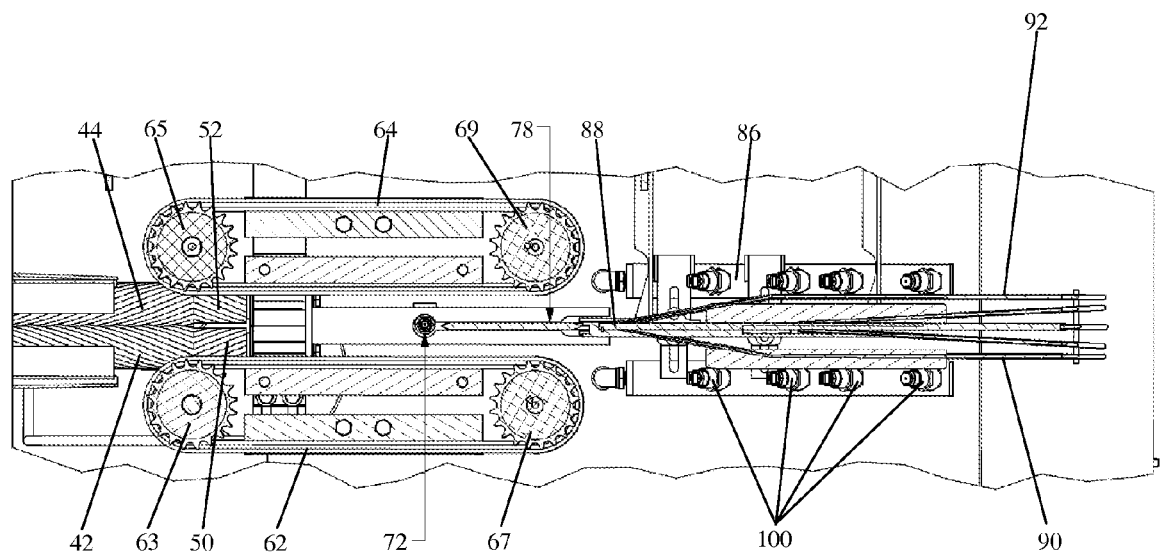
FIG. 5b is a detail, top view illustrating several components of the first embodiment of the present invention shown in FIG. 1.

Referring to FIGS. 3, 5a, and 5b, the upstream end of the sticker chain 82 is positioned above, and is in a close-clearance relationship with, the downwardly angled, downstream end of the spreading fin 78. The sticker chain 82 is positioned laterally intermediate the spreading rails 90 and 92. The lower run of the sticker chain 82 is in a close clearance relationship with, and is preferably spaced about half an inch above, the spreading rails 90 and 92 and the cleaning platform 80. The downstream end of the sticker chain 82 extends beyond the downstream ends of the spreading rails 90 and 92, over the outlet station 20 (described below).

The retaining block 84 of the cleaning station 18 is a longitudinally elongated member, preferably formed of DELRIN, that is rigidly mounted to the rear support wall 21 and extends forward to position its lower face immediately above the lower run of the sticker chain 82 and below the upper run of the sticker chain 82. The lower face of the retaining block 84 limits upward movement of the lower run of the sticker chain 82, thereby reinforcing the chain 82 and enabling the chain 82 to apply a consistent downward force on a poultry gizzard passing between the chain 82 and the spreading rails 90 and 92 (as described below) without allowing the gizzard to deflect the lower run of the chain 82 upwardly.

The upstream end of the retaining block 84 preferably curves upwardly to create a gradually decreasing separation in the downstream direction between the lower face of the retaining block 84 and the lower run of the sticker chain 82 adjacent to where gizzards enter the vertical gap between the sticker chain 82 and the spreading rails 90 and 92. With this configuration, after entering the gap between the chain 82 and the rails 90 and 92, a gizzard that engages the sticker chain 82 is able, for a short distance of its downstream travel, to deflect the unsupported lower run of the chain 82 upwardly a short distance (by virtue of the fact that the gizzard is taller than the gap between the chain 82 and the spreading rails 90 and 92). The separation between the retaining block 84 and the sticker chain 82 thereafter decreases in the downstream direction, with the retaining block 84 extending in reinforcing engagement with the lower run of the sticker chain 82 and causing the sticker chain 82 to apply a gradually increasing downward force on the gizzard below (i.e. by not allowing upward deflection of the chain 82), as will be described in greater detail below.

The water sprayer manifold 86 of the cleaning station 18 is mounted to the rear support wall 21 below the cleaning platform 80 and includes a water supply line 98 connected to a plurality of upwardly directed nozzles 100 arranged in a pair of laterally spaced, longitudinally extending rows. The water supply line 98 is connected to a high pressure water pump (not shown). During operation of the apparatus 10, the nozzles 100 emit pressurized streams of water upwardly, toward the cleaning platform 80. The streams of water are preferably wider and are not as pressurized as the stream of water emitted by the water knife 72 (described above), and are preferably not capable of cutting or otherwise damaging poultry gizzards that are conveyed along the spreading rails 90 and 92 (as described below).

Referring to FIG. 3, the outlet station 20 of the apparatus 10 includes an angled outlet chute 102 having an open inlet end that is positioned below the downstream end of the spreading rails 90 and 92. The chute 102 extends downwardly through a floor of the apparatus adjacent the trough 26 and terminates in an open outlet end. A collection bin (not shown) is preferably positioned below the outlet end of the chute 102 for receiving split poultry gizzards.

During typical operation of the apparatus, as depicted in FIGS. 3 and 4, a poultry gizzard 104 is manually fed into the inlet end of the infeed chute 34 with the proventriculus 106 of the gizzard 104 extending downwardly through the gut channel 40 of the infeed chute 34. Inserted thusly, one lobe of the gizzard 104 is positioned substantially on one lateral side of the infeed chute 34 and the other lobe of the gizzard 104 is positioned substantially on the opposing lateral side of the infeed chute 34. The gut channel 40 thus ensures that orientation of the gizzard 104 is maintained as the gizzard 104 slides by gravity down the angled portion 36 of the chute 34.

When the gizzard 104 reaches the lower, horizontal portion 38 of the infeed chute 34, the bottom of the gizzard 104, including the proventriculus 106, is brought into engagement with the conveyor rollers 42 and 44 of the gut-removal station 14. As described above, the ridges 50 and 52 that extend from the conveyor rollers 42 and 44 simultaneously urge the gizzard 104 in the downstream direction and gently grip and pull the proventriculus 106 downwardly, into a narrow gap between the rollers 42 and 44, while maintaining the orientation of the gizzard 104.

Next, when the gizzard 104 reaches the upstream end of the cutting spindles 54 and 56, the sides of the gizzard 104 are gripped by the inwardly-facing spikes of the opposing, rotating sticker chain belts 62 and 64 in the manner described above. The sticker chain belts 62 and 64 pull the gizzard 104 downstream, over the cutting spindles 54 and 56, with the proventriculus 106 of the gizzard 104 being drawn into the cutting threads 58 and 60 of the spindles 54 and 56. As the gizzard 104 passes over the cutting spindles 54 and 56, the cutting threads 58 and 60 cooperatively cut and pull the proventriculus 106 from the gizzard 104 downwardly, between the cutting spindles 54 and 56, and discharge the proventriculus 106 by gravity into the trough 26 below. It is contemplated that any other suitable means for removing the proventriculus 106 from the gizzard 104 can be substituted for the above-described conveyor rollers 42 and 44 and cutting spindles 54 and 56, including, but not limited to, a conventional stationary or rotating blade.

After the proventriculus 106 has been removed, the sticker chain belts 62 and 64 continue to drive the gizzard 104 downstream, onto and along the splitting platform 66. As the gizzard 104 is moved over the upstream end of the splitting channel 70 in the splitting platform 66, the pressurized stream of water emitted by the water knife 72 partially splits the gizzard 104 intermediate its laterally-adjacent lobes. The pressure of the stream of water and the speed with which the gizzard passes over the stream (i.e. the speed of the sticker chain belts 62 and 64) are preferably calibrated to allow the water knife 72 to cut substantially through the lower vertical half of the gizzard 104, into the gizzard's internal cavity, while leaving the upper vertical half of the gizzard 104 substantially intact. Of course, a deeper cut into the gizzard 104 can be made by decreasing the speed of the sticker chain belts 62 and 64 or by increasing the pressure or changing the shape or size of the water stream, and a shallower cut can be made by increasing the speed of the sticker chain belts 62 and 64 pass or by decreasing the pressure of the water stream. Importantly, in addition to splitting the gizzard 104 in the manner described above, the stream of water emitted by the water knife 72 loosens and dislodges some of the tightly packed ingest contained inside of the gizzard 104.

The sticker chain belts 62 and 64 continue to move the gizzard 104 past the water knife 72 and onto the spreading fin 78, with the spreading fin 78 entering the freshly cut slit in the bottom half of the gizzard 104. As the gizzard 104 moves over the spreading fin 78, the fin 78 enlarges the slit and further separates the lobes of the gizzard 104. When the gizzard 104 reaches the downstream end of the spreading fin 78 and is about to be released by the chain belts 62 and 64, the top of the gizzard is engaged by the spikes of the upstream end of the sticker chain 82, which press and pull the gizzard 104 downward and downstream along the downwardly angled, rear portion of the spreading fin 78. The sticker chain 82 further drives the gizzard 104 from the spreading fin 78 onto the nose 88 at the upstream end of the cleaning platform 80, with the nose 88 entering the slit intermediate the lobes of the gizzard 104. As the sticker chain 82 continues to drive the gizzard 104 downstream beyond the nose 88, the interior surfaces of the lobes engage the spreading rails 90 and 92 as the sticker chain 82, reinforced by the retaining block 84 in the manner described above, applies a gradually increasing downward force on the gizzard 104. The spreading rails thus force the lobes of the gizzard upwardly and apart, thereby splaying the lobes over the rails 90 and 92 and exposing the interior cavity of the gizzard 104 intermediate the rails 90 and 92.

As the gizzard 104 is forced further downstream atop the spreading rails 90 and 92, the gizzard 104 moves over the upwardly-directed streams of water emitted by the nozzles 100 of the water sprayer manifold 86. The streams of water enter the exposed, interior cavity of the gizzard 104, thereby flushing and cleaning the previously loosened ingest out of the cavity. The water and the removed ingest then fall by gravity into the trough 26. After the gizzard 104 has been driven through the water sprayer manifold 86, it has been thoroughly cleaned and the sticker chain 82 drives the gizzard off of the downstream end of the spreading rails 90 and 92, where the split and cleaned gizzard 104 is allowed to fall by gravity into the inlet end of the outlet chute 102 and to a collection bin below. The gizzard can then be collected for packaging or further processing.

Figure 6:
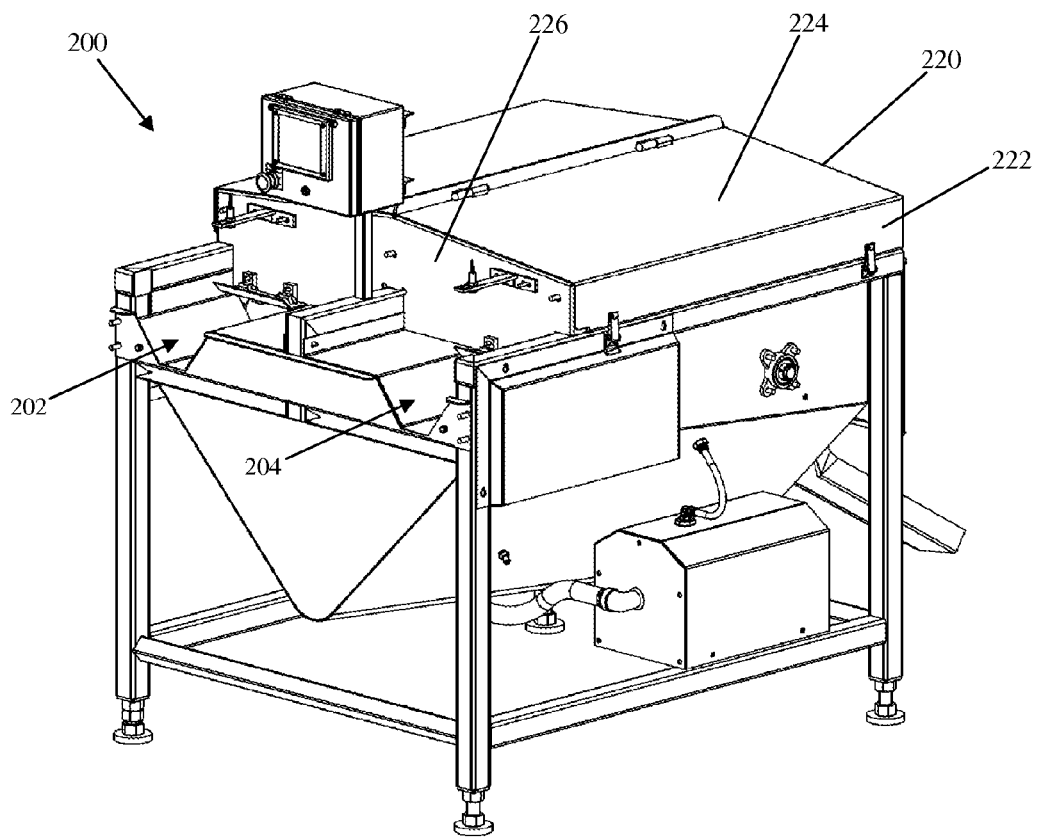
FIG. 6 is a perspective view illustrating a second embodiment of the present invention.

Referring to FIG. 6, a second contemplated embodiment of the poultry gizzard processing apparatus of the present invention, indicated generally at 200, is illustrated. The apparatus includes two, substantially identical, laterally side-by-side processing lines 202 and 204 that can be operated independently of one another for allowing two operators to process gizzards simultaneously in the manner described below. The processing lines 202 and 204 are substantially mirror images of one another and will therefore be described with reference to the processing line 204 on the right side (as viewed in FIG. 6) of the apparatus 200 only, and the processing line 204 shall hereafter be referred to as "the apparatus 204." It will be understood that such description shall extend to the processing line 202 on the left side of the apparatus 200 with necessary consideration given to differences in the respective positions and orientations of the various components of the processing line 202. It is contemplated that the processing line 202 can be entirely omitted from the apparatus 200.

Figure 7:
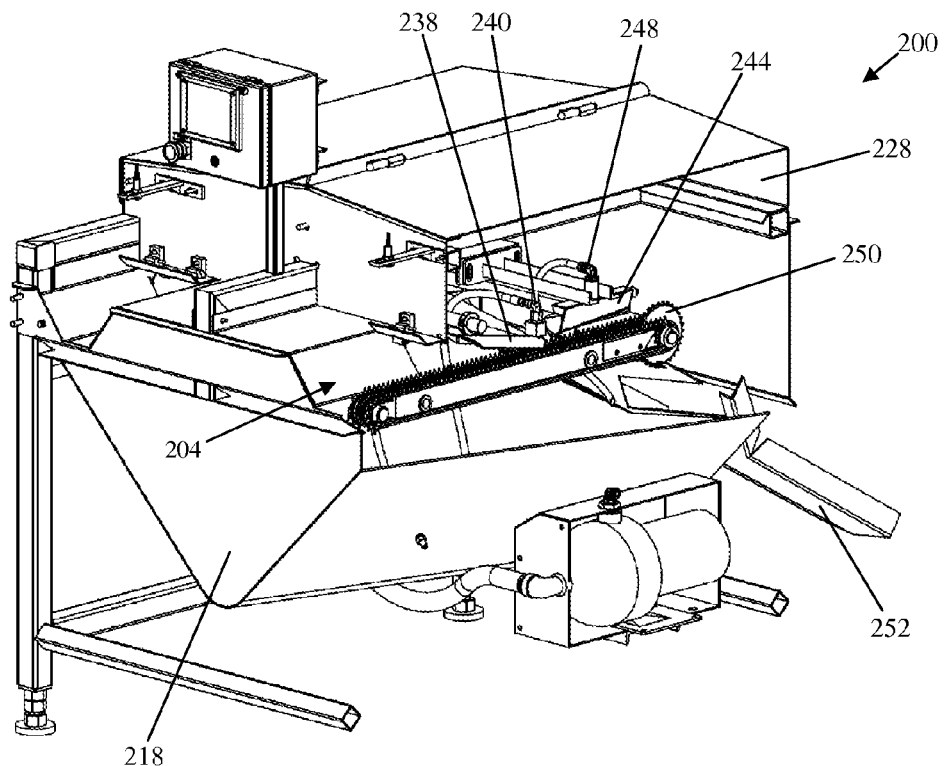
FIG. 7 is a cut-away, perspective view illustrating the second embodiment of the present invention shown in FIG. 6.
Figure 8:
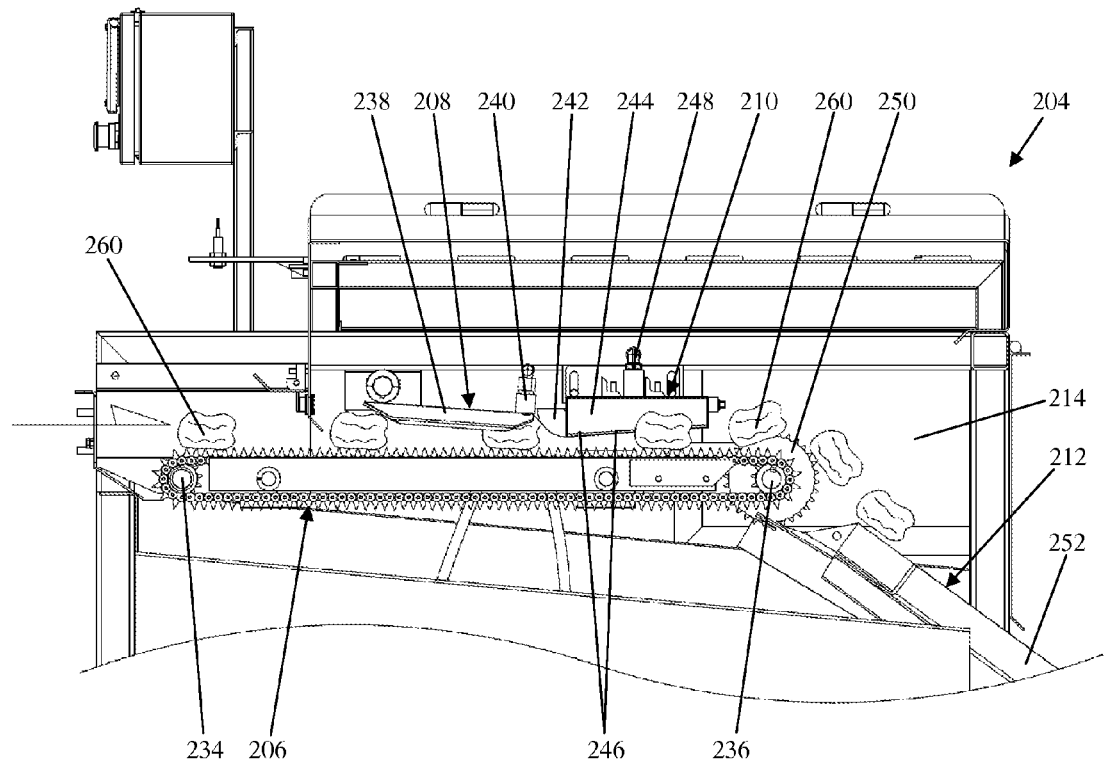
FIG. 8 is a cut-away, side elevation view illustrating the second embodiment of the present invention shown in FIG. 6.
Figure 9:
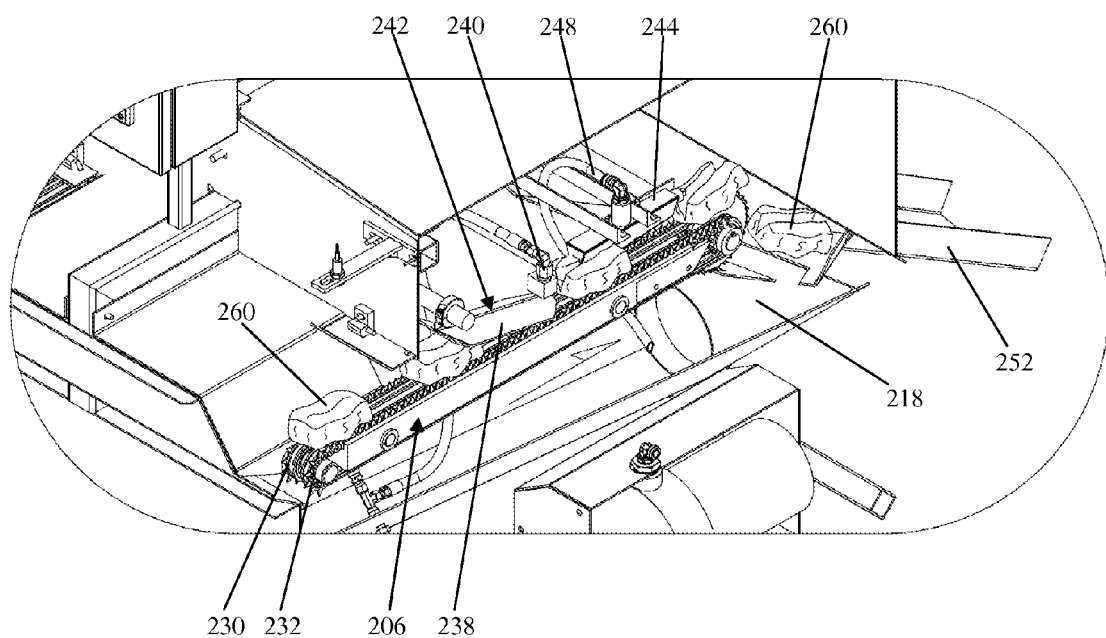
FIG. 9 is a cut-away, detail view illustrating several components of the second embodiment of the present invention shown in FIG. 6.

Referring now to FIGS. 7-9, the apparatus 204 includes a conveyor line 206, a splitting station 208, a cleaning station 210, and an outlet station 212. The apparatus 204 further includes a rear support wall 214 to which the aforementioned components of the apparatus 204 are directly or indirectly mounted, as well as a trough 218 located below the aforementioned components for catching waste matter that falls therefrom. A protective cover 220 (shown in FIG. 6), defined by perpendicularly-adjoining front, top, upstream, and downstream walls 222, 224, 226, and 228 is hingidly mounted to the top of the apparatus 204 for shielding workers from the moving parts of the apparatus 204 and mitigating the risk of injury. The protective cover 220 also provides convenient access to the components of the apparatus 204, such as for repair or replacement, when the cover 220 is pivoted to a raised position. The apparatus 204 is shown with the protective cover 220 entirely removed or cut away in FIGS. 7-9 for clarity.

As with the apparatus 10 described above, all components of the apparatus 204 are preferably fabricated from stainless steel unless otherwise noted. It is contemplated that various components of the apparatus 204 can alternatively be fabricated from any other sufficiently rigid, food-grade material, including, but not limited to aluminum, polyoxymethylene (sold under the brand name DELRIN), and various composites.

Referring to FIGS. 7-9, the conveyor line 206 of the apparatus 204 includes a pair of vertically-oriented, laterally-spaced sticker chains 230 and 232 that are operatively mounted to pairs of longitudinally-spaced sprockets at the upstream and downstream ends of the sticker chains. The sprockets at the upstream end of the line are rotatably mounted to an axle 234 that extends from the rear wall 214, such as by mounting in conventional replaceable bearings, and the sprockets at the downstream end of the sticker chains are rigidly mounted to a horizontally-extending drive shaft 236 that protrudes from the rear wall 214. The drive shaft 236 is rotatably driven by a motor (not within view), thereby driving the conveyor line 206 in the manner of an endless conveyor with the upper run of the conveyor line 206 moving in the downstream direction. The upper run of the conveyor line 206 thus defines a product path along which poultry gizzards are conveyed during operation of the apparatus 204, as will be described in greater detail below. It is contemplated that the sticker chains 230 and 232 can be substituted by one or more conventional belts or chain conveyors.

The splitting station 208 of the apparatus 204 includes, in downstream sequence, a presser plate 238 and a water knife 240. The presser plate 238 is a longitudinally-elongated, downwardly-angled plate that is mounted to the rear wall 214 and extends over the conveyor line 206. The presser plate 238 extends from a relatively taller upstream end to a relatively shorter downstream end, thereby defining a gap of decreasing height between the presser plate 238 and the upper run of the conveyor line 206. The presser plate 238 is laterally bisected by a longitudinally-extending channel 242, hereafter referred to as "the splitting channel 242." The splitting channel 242 is preferably about half an inch wide. The bifurcated, lateral halves of the presser plate 238 preferably extend laterally outwardly and downwardly from the splitting channel 242 to provide the presser plate 238 with a "tented" shape. The water knife 240 of the splitting station 208 is substantially identical to the water knife 72 of the apparatus 10 described above. The water knife 240 is directed downwardly and is positioned above the presser plate 238, at or near the downstream end of the splitting channel 242.

Referring to FIG. 8, the cleaning station 210 of the apparatus 204 includes a spreading fin 242 and a water sprayer reservoir 244. The spreading fin 242 is a vertically-oriented, wedge-shaped member having a rounded, tapered upstream and lower edge that is positioned in the middle of the product path, immediately downstream from the water knife 240. The spreading fin 242 is preferably mounted to, and extends upstream from, the water sprayer reservoir 244 (described below). The lower edge of the spreading fin 242 is positioned about one to three inches above the upper run of the conveyor line 206.

The water sprayer reservoir 244 is a longitudinally-elongated, wedge-shaped, substantially hollow vessel that is mounted to the rear wall and extends to a position above the conveyor line 206. The reservoir 244 tapers to a lower edge that is spaced above the conveyor line 206 and is aligned and substantially contiguous with the lower edge of the spreading fin 242. A longitudinally-spaced series of apertures 246 is formed in the lower edge of the reservoir 244 for allowing streams of water to be emitted therefrom. The reservoir 244 is connected to a water supply line 248 that is fed by a high pressure water pump (not shown). It is contemplated that the water sprayer reservoir 244 can be substituted by a spreading platform and a water sprayer manifold that are similar to the spreading platform 66 and water sprayer manifold 86 of the apparatus 10 described above.

The outlet station 212 of the apparatus includes an ejector wheel 250 and an outlet chute 252. The ejector wheel 250 is a round plate that is rigidly mounted to the drive shaft 236 laterally intermediate the sprockets at the downstream of the conveyor line 206, with the drive shaft passing through the axis of the ejector wheel 250. The ejector wheel 250 has a radius that is greater than the radius of the downstream sprockets and preferably has spikes protruding from its periphery. The upper portion of the ejector wheel 250 thus extends upwardly into the product path of the apparatus 204 to remove product from the sticker chains 230 and 232 (as described below).

The outlet chute 252 of the outlet station 212 is a downwardly angled slide having an inlet end that is positioned below the ejector wheel 250 at the downstream end of the conveyor line 206. The outlet chute 252 preferably extends through a downstream wall of the apparatus 204 and terminates in an outlet end. A collection bin (not shown) is preferably positioned below the outlet end of the chute 252 for receiving split poultry gizzards (as further described below).

During typical operation of the apparatus 204, as depicted in FIGS. 8 and 9, a poultry gizzard 260 (with its proventriculus preferably previously removed) is manually placed on the conveyor line 206 with one lobe of the gizzard 260 positioned substantially on one of the sticker chains 230 and the other lobe of the gizzard 260 positioned substantially on the other sticker chain 232. Although it is not critical, the lobes of the gizzard 260 are preferably pressed firmly against the sticker chains 230 and 232 with sufficient force to cause the spikes of the sticker chains 230 and 232 to pierce the lobes and thereby secure the orientation of the gizzard 260 as it is carried downstream.

The gizzard 260 is driven downstream to enter the gap between the presser plate 238 and the conveyor line 206. As the gizzard 260 progresses downstream below the presser plate 238, the gap shortens and the gizzard 260 is squeezed between the presser plate 238 and the upper run of the conveyor line 206. The presser plate 238 thereby presses the gizzard 260 into firm engagement with the spikes of the sticker chains 230 and 232 of the conveyor line 206 and ensures that the orientation of the gizzard 260 is maintained as it nears the water knife 240.

As the gizzard 260 reaches the downstream end of the presser plate 238, the pressurized stream of water emitted by the water knife 240 passes through the splitting channel 242 and partially splits the gizzard 260 intermediate its lobes. The pressure of the stream of water and the speed with which the gizzard 260 is conveyed below the stream (i.e. the speed of the conveyor line 206) are preferably calibrated to allow the water knife 240 to cut substantially through the upper vertical half of the gizzard 260, into the gizzard's internal cavity, while leaving the lower vertical half of the gizzard 260 substantially intact. Of course, a deeper cut into the gizzard 260 can be made by decreasing the speed of the conveyor line 260 or increasing the pressure of the water stream, and a shallower cut can be made by increasing the speed of the conveyor line 206 or decreasing the pressure of the water stream. Importantly, in addition to splitting the gizzard 260 in the manner described above, the stream of water emitted by the water knife 240 loosens and dislodges some of the tightly packed ingest contained inside of the gizzard 260.

Next, the conveyor line 206 moves the gizzard 260 into engagement with the spreading fin 242, with the edge of the spreading fin 242 entering the freshly cut slit in the top half of the gizzard 260. As the gizzard 260 moves into the spreading fin 242, the gradually widening fin 242 enlarges the slit and further separates the lobes of the gizzard 260. As the gizzard 260 continues downstream, the spreading fin 242 acts as funnel for feeding the tapered, lower edge of the water reservoir 244 into the slit. The lobes of the gizzard 260 are thereby splayed onto either lateral side of the reservoir 244.

The gizzard 260 is further driven along the lower edge of the water reservoir 244, below the downwardly-directed streams of water emitted from the apertures 246. The streams of water enter the exposed, interior cavity of the gizzard 260, thereby flushing and cleaning the previously loosened ingest out of the cavity. The streams of water are preferably emitted from the apertures 246 in a slightly downstream-angled direction to force the ingest horizontally out of the cavity. The water and the removed ingest then fall by gravity into the trough 218.

After the gizzard 260 has been cleaned, the conveyor line 206 drives the gizzard 260 into the rotating ejector wheel 250. The rotating spikes of the ejector wheel 250 engage the bottom of the gizzard 260 and force the gizzard 260 upwardly, off of the spikes of the conveyor chains 230 and 232 to which the gizzard was previously stuck. The ejector wheel 250 then pulls the gizzard 260 in the downstream direction, over the wheel 250. The split and cleaned gizzard 260 is thereafter allowed to fall by gravity onto the upper end of the outlet chute 252 and slide and to a collection bin below. The gizzard 260 can then be collected for packaging or further processing.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An apparatus for splitting and cleaning poultry gizzards, the apparatus comprising:
   a. means for conveying a poultry gizzard along a product path in a downstream direction;
   b. a water knife positioned adjacent the product path for cutting a slit into the poultry gizzard; and
   c. at least one water sprayer positioned downstream from the water knife, adjacent the product path, for emitting water into an interior cavity of the poultry gizzard and forcibly cleaning ingest out of the cavity.

2. The apparatus in accordance with claim 1, wherein the slit extends partially through the gizzard, into the interior cavity of the gizzard.

3. The apparatus in accordance with claim 1, further comprising means for removing a proventriculus from the poultry gizzard.

4. The apparatus in accordance with claim 3, wherein the means for removing the proventriculus comprises:
   a. a pair of rotatably driven conveyor rollers having ridges extending radially therefrom that cooperatively rotate to urge a poultry gizzard seated thereupon in the downstream direction and to pull a proventriculus of the poultry gizzard downwardly,
   b. a pair of rotatably driven cutting spindles positioned downstream from the conveyor rollers having intermeshing cutting threads extending radially therefrom for severing the proventriculus of the poultry gizzard as the gizzard is conveyed over the cutting spindles.

5. The apparatus in accordance with claim 4, further comprising an infeed chute positioned upstream from the conveyor rollers for conveying the poultry gizzard from an inlet end of the chute by gravity to the conveyor rollers, the infeed chute having a floor with an elongated gut channel formed therein for allowing the proventriculus of a poultry gizzard to extend therethrough as the poultry gizzard moves through the chute.

6. The apparatus in accordance with claim 1, further comprising a spreading fin positioned upstream of said at least one water sprayer for entering and enlarging the slit in the poultry gizzard.

7. The apparatus in accordance with claim 6, further comprising a pair of laterally-spaced spreading rails extending downstream from near a downstream end of the spreading fin for spreading separated portions of the poultry gizzard apart as the poultry gizzard is moved downstream along the spreading rails, thereby exposing an interior cavity of the poultry gizzard.

8. The apparatus in accordance with claim 7, wherein said at least one water sprayer is located below the spreading rails for emitting water upwardly into the exposed, interior cavity of the poultry gizzard.

9. The apparatus in accordance with claim 6, wherein the water sprayer comprises a wedge-shaped reservoir having a tapered edge that is substantially contiguous with an edge of the spreading fin for entering the enlarged slit in the poultry gizzard, the tapered edge of the reservoir having at least one aperture formed therethrough from which the water is emitted into an interior cavity of the poultry gizzard as the poultry gizzard is moved downstream along the reservoir with separated portions of the poultry gizzard splayed on either lateral side of the reservoir.

10. The apparatus in accordance with claim 1, wherein the means for conveying the poultry gizzard comprises at least one rotatably driven sticker chain.

11. The apparatus in accordance with claim 10, wherein said at least one sticker chain comprises sets of horizontally-oriented sticker chains positioned adjacent lateral sides of the product path for engaging sides of the poultry gizzard.

12. The apparatus in accordance with claim 10, wherein said at least one sticker chain is positioned above the product path for engaging a top of the poultry gizzard.

13. The apparatus in accordance with claim 10, wherein said at least one sticker chain comprises a pair of laterally adjacent sticker chains positioned below the product path for supporting a bottom of the poultry gizzard.

14. The apparatus in accordance with claim 10, further comprising a presser plate positioned above the product path for engaging a top of the poultry gizzard and pressing the poultry gizzard against the pair of sticker chains.

15. The apparatus in accordance with claim 14, wherein the presser plate has a longitudinally elongated channel formed therethrough through which a water stream from the water knife passes.

16. The apparatus in accordance with claim 10, further comprising an ejector wheel rotatably mounted adjacent a downstream end of said at least one sticker chain and extending into the product path for engaging the poultry gizzard and lifting the poultry gizzard off of the sticker chain.

17. The apparatus in accordance with claim 10, further comprising a retaining block mounted above a lower run of said at least one sticker chain for limiting upward movement of the lower run of the sticker chain.

18. An apparatus for splitting and cleaning poultry gizzards, the apparatus comprising:
   a. means for conveying a poultry gizzard along a product path in a downstream direction;
   b. a pair of rotatably driven conveyor rollers having ridges extending radially therefrom that cooperatively rotate to pull a proventriculus of the poultry gizzard downwardly into a gap between the conveyor rollers;
   c. a pair of rotatably driven cutting spindles positioned downstream from the conveyor rollers having intermeshing cutting threads extending radially therefrom for severing the proventriculus of the poultry gizzard as the gizzard is conveyed over the cutting spindles;
   d. a water knife positioned below the product path that emits an upwardly directed stream of water for cutting a slit into a bottom of the poultry gizzard;
   e. a spreading fin positioned downstream of the water knife for entering and enlarging the slit in the poultry gizzard;
   f. a pair of laterally-spaced spreading rails extending downstream from near a downstream end of the spreading fin for spreading separated portions of the poultry gizzard apart as the poultry gizzard is moved downstream along the spreading rails, thereby exposing an interior cavity of the poultry gizzard; and
   g. at least one water sprayer positioned below the spreading rails for spraying water through a channel between the spreading rails and into an exposed, interior cavity of the poultry gizzard and forcibly cleaning ingest out of the cavity.

19. An apparatus for splitting and cleaning poultry gizzards, the apparatus comprising:
   a. means for conveying a poultry gizzard along a product path in a downstream direction;
   b. a presser plate positioned above the product path for engaging a top of the poultry gizzard and compressing the poultry gizzard;
   c. a water knife positioned above the product path adjacent a downstream end of the presser plate that emits a downwardly directed stream of water for cutting a slit into a top of the poultry gizzard;
   e. a spreading fin positioned downstream of the water knife for entering and enlarging the slit in the poultry gizzard; and
   f. a wedge-shaped reservoir having a tapered edge that is substantially contiguous with an edge of the spreading fin for entering the enlarged slit in the poultry gizzard, the tapered edge of the reservoir having at least one aperture formed therethrough from which water is emitted into an interior cavity of the poultry gizzard and forcibly cleaning ingest out of the interior cavity.

20. A method for splitting and cleaning poultry gizzards, the method comprising:
   a. conveying a poultry gizzard along a product path in a downstream direction;
   b. cutting a slit into the poultry gizzard with a water knife positioned adjacent the product path to expose an interior cavity of the poultry gizzard; and
   c. spraying water into an interior cavity of the poultry gizzard to forcibly clean ingest out of the cavity.

21. The method in accordance with claim 20, further comprising severing a proventriculus from the poultry gizzard.

22. The method in accordance with claim 20, further comprising securing an orientation of the poultry gizzard.

\* \* \* \* \*

UNITED STATES PATENT AND TRADEMARK OFFICE
CERTIFICATE OF CORRECTION

PATENT NO.        : 8,439,730 B1
APPLICATION NO.   : 13/397162
DATED             : May 14, 2013
INVENTOR(S)       : Geno N. Gasbarro It is certified that error appears in the above-identified patent and that said Letters Patent is hereby corrected as shown below:

In the Claims:

Column 12, line 43, at end of sentence after "," add --into a gap between the conveyor rollers; and--

Signed and Sealed this
Twenty-fifth Day of June, 2013

Teresa Stanek Rea
*Acting Director of the United States Patent and Trademark Office*